(12) United States Patent
Lau

(10) Patent No.: US 8,726,795 B2
(45) Date of Patent: May 20, 2014

(54) FRYER

(75) Inventor: Wing Chung Joseph Lau, Hong Kong (CN)

(73) Assignee: Shun Fai Industrial Ltd., Kowloon (HK)

( * ) Notice: Subject to any disclaimer, the term of this patent is extended or adjusted under 35 U.S.C. 154(b) by 28 days.

(21) Appl. No.: 13/496,866

(22) PCT Filed: Jul. 30, 2010

(86) PCT No.: PCT/CN2010/075579
§ 371 (c)(1),
(2), (4) Date: Mar. 16, 2012

(87) PCT Pub. No.: WO2012/012948
PCT Pub. Date: Feb. 2, 2012

(65) Prior Publication Data
US 2012/0180673 A1    Jul. 19, 2012

(51) Int. Cl.
*A47J 37/12* (2006.01)
(52) U.S. Cl.
USPC ........................................................... 99/409
(58) Field of Classification Search
USPC ............ 219/217; 99/409, 353, 495, 510–513, 99/403, 484; 210/369; 126/299 E
See application file for complete search history.

(56) References Cited

U.S. PATENT DOCUMENTS

| | | | | |
|---|---|---|---|---|
| 5,611,265 A * | 3/1997 | Ronci et al. | ...................... | 99/353 |
| 5,771,781 A | 6/1998 | Sham | | |
| 5,865,109 A * | 2/1999 | Bull | ................................. | 99/495 |
| 6,006,658 A | 12/1999 | Siu | | |
| 6,412,401 B1 | 7/2002 | Mariotti | | |
| 8,402,885 B2 * | 3/2013 | Foster et al. | .................... | 99/409 |

FOREIGN PATENT DOCUMENTS

CN    1339950    3/2002
CN    2925357    7/2007

OTHER PUBLICATIONS

ISR for related PCT/CN2010/075579 dated May 12, 2011.

* cited by examiner

*Primary Examiner* — Dana Ross
*Assistant Examiner* — Renee L Miller
(74) *Attorney, Agent, or Firm* — Ladas & Parry, LLP

(57) ABSTRACT

A fryer has spinning function to spin fried food of residual oil on the food. The fryer comprises an oil container (101) having a spindle extending from the centre of the base of the oil container. A basket (201) made of wire mesh having a funnel (203) in the centre of the basket is provided, and is suitable for lowering into the oil container with the funnel slipped over the spindle (401). In a lowered position, the basket submerges food into oil in the container for frying. In a raised position, food in the basket is raised above surface of the oil to terminate the frying. A cover (109) is provided for closing over the oil container and the basket. The underside of the cover has a coupler (501) for engaging the funnel of the basket and also the spindle when the cover closes over the oil container. The spindle can be spun by a motor in the fryer such that, when the spindle spinning the coupler rotates along with the spindle. The coupler with flanges that push against fins (207) extending from the funnel of the basket also rotates the basket. The fins and the flanges interweave with sufficient excess space or distance to prevent the fins from getting stuck to the flanges.

6 Claims, 17 Drawing Sheets

FRYER

CROSS-REFERENCE TO RELATED APPLICATIONS

This application is the U.S. National Stage of International Patent Application No. PCT/CN/2010/075579 filed on Jul. 30, 2010, the disclosure of which is hereby incorporated by reference in its entirety.

FIELD OF INVENTION

This invention relates to a fryer for food. In particular the invention relates to a domestic fryer. More particularly, the invention relates to a fryer with spinning function to dispel oil.

BACKGROUND OF THE INVENTION

Electric appliances such as domestic fryers are commonly used to automate food frying in a home setting. These devices relieve the housewife from the discomfort, hassle and danger of frying food manually.

Typically, a fryer comprises a container for oil. The base of the container has a heater element hidden within or a heater element immersed into oil, which heats the oil in the container when it is powered up.

A basket is provided which can be submerged into oil in the container. The basket is for containing food to be fried. The basket is typically made entire of wire mesh, which can withstand breaking down in hot oil.

The basket is placed onto a frame inside the container. The frame is connected to a handle on the external surface of the container. The handle is attached to the external surface of the container in such a way that the handle can be slid upwardly or downwardly on the external surface of the container. The raising or lowering of the handle causes the frame inside the container to be raised and lowered at the same time. The basket placed on the frame is accordingly raised or lowered by moving the handle. This allows the basket to move relatively to the frame and the container.

When the basket is lowered into the container, food in the basket may be fried in hot oil in the lower part of the container. Conversely, when the basket is lifted from the container, food in the basket is raised above the oil to terminate the frying.

A spindle extends upwardly from the bottom of the container and is rotatable about a vertical axis. A motor hidden in the base of the container is capable of spinning the spindle.

As shown in the illustration of FIG. 1a, the top end of the spindle has a set of two clips, each clip extending radially in opposite directions from the spindle axis. The clips are for engaging the basket so that the basket is rotated when the spindle spins.

At the centre of the base of the basket is an upwardly extending funnel, which defines a through hole from the base of the funnel to the top of the funnel. Thus, the funnel is capable of being slipped over the spindle in the container.

The clips are typically made of metal strips designed to be resilient like springs, i.e. the clips are physically resilient and deformable. The clips are biased to extend in the radial direction of the spindle, over a specific distance which is longer than the diameter of the funnel. Thus, when the funnel is slipped onto the spindle, the clips deform under pressure exerted by the internal circumference of the funnel, and are pressed against the spindle. The deformation of the clips allows the funnel to slip past the clips and onto the rest of the spindle.

When the basket is slipped onto the spindle and brought to a lowered position which is beneath the clips, the funnel and the clips are not mechanically engaged to each other.

However, the basket can be raised on the spindle, such that the funnel is moved into a position to be fixed to the top of the spindle. To fix the basket, there are indentations along the internal wall of the funnel which correspond to the clips. The indentations are spaces in the funnel which allow the clips, deformed when the funnel is passing over them, to snap into their original structure. Thus, the clips extending into the indentations hold the basket in the raised position on the spindle. In this position, when the spindle spins the affixed basket rotates along with the spindle. As the basket is above the oil level in the raised position, the rotation of the basket provides a centrifugal force to dispel oil in the food.

To remove the basket from the spindle in this raised position, the user simply pulls the basket away from spindle by brute force, again forcing the clips to deform in order to slip out from the indentations, and to allow the funnel to pass over.

The lowering and raising of the basket by the frame provides room for the basket to wobble a little during the movement. If the funnel axis and the spindle axis are not aligned when the funnel engages the clips, one of the clips may be engaged while the other clip is not engaged by the basket funnel. This causes the basket to be jammed in the misaligned position on the spindle. It is difficult for a housewife to disengage the jamming because of the oil, heat and strength required.

Furthermore, the action of slipping the basket funnel onto the spindle and the action of lifting the basket free of the spindle are both difficult for a small and delicate housewife.

Therefore, it is desirable to provide a fryer which has a reduced likelihood of a basket jamming onto the spindle and is also physically easy to operate in a domestic kitchen by a delicate housewife.

SUMMARY OF THE INVENTION

In a first aspect, the invention proposes a fryer comprising a container for containing oil for food frying, the container having a spindle capable of spinning, a basket for containing food, the basket capable of being positioned in the container such that food in the basket is away from the oil, the basket having at least one fin, at least one flange, the flange being movable by the movement of the spindle, in a first position, the fin and the flange are not positioned to engage each other, in a second position, the fin and the flange are positioned to engage each other, such that the flange when moved by the movement of the spindle being capable of pushing on the fin to rotate the basket, wherein the fin and the flange are each dimensioned such that there is an excess space between the flange and the fin when the flange and the fin are moved from the first position into the second position.

The skilled man understands that 'excess space' means any amount of sufficient room for any parts of the flange and the fin to engage each other, without requiring the parts to deform physically in order to accommodate each other. The actual extent to which the space is in 'excess' depends on different embodiments. In some embodiments, there could be as little excess space as may be provided by precision engineering allowing the fin and flange to work together.

Functionally, the excess space provides sufficient room between the fin and flange to relieve the need for deformable, resilient parts while providing an engagement between the spindle and the basket. In other words, the excess space provides the possibility of ease of movement between the fin and the flange, which reduces or removes the need for parts on the spindle or even the funnel which are deformable. Thus, chance of the flange being stuck onto the fin due to a deformable part getting stuck is reduced.

Typically, the fin and the flange are made of generally non-deformable material, such as suitable plastic, ceramics, metal and so on. This provides further reduction of a deformable part stuck to another part.

Typically, the spindle is driven from the base of the container.

Preferably, the fryer further comprising a coupler the at least one flange being attached to a coupler; the spinning of the spindle is capable of rotating the coupler to move the flange; wherein the coupler translates the spinning of the spindle to the basket, whereby the coupler provides an indirect coupling between the spindle and the basket to allow the spindle to rotate the basket in the raised position.

Optionally, the fin resides on the basket, while the flange resides on the spindle or the coupler. In either case, there is need for a tight-fitting, or a snap-fitting engagement between the basket and the spindle (or the coupler) is reduced or removed; there is no need for any deformable fixture such as clips for snap-fitting onto any indentation on the basket. Relieving the embodiments of the need of a deformable part reduces the likelihood that the basket is stuck to the spindle; this prevents jamming of the basket to the spindle.

Preferably, the basket has a funnel for slipping over the spindle, and the fin extends from the funnel.

Preferably, the fryer further comprises a cover, the coupler being rotatably mounted onto the cover; when the cover is closed onto the container, the cover capable of moving the coupler to engage the spindle so that the spinning of the spindle is capable of rotating the coupler to move the flange.

In specific embodiments, the cover is hinged to the container.

Therefore, the invention provides a possibility of a rotating shaft that is indirectly coupled to the basket. In one example, the coupler is used to couple the basket to the rotating shaft. Thus, the need of clips or other mechanical securing devices on the rotation shaft is possibly relieved. Advantageously, there is reduced likelihood of the basket being jammed to any portion of the spindle when it is moved from lowered to the raised position

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

DESCRIPTION OF AN EMBODIMENT

Figure 1:
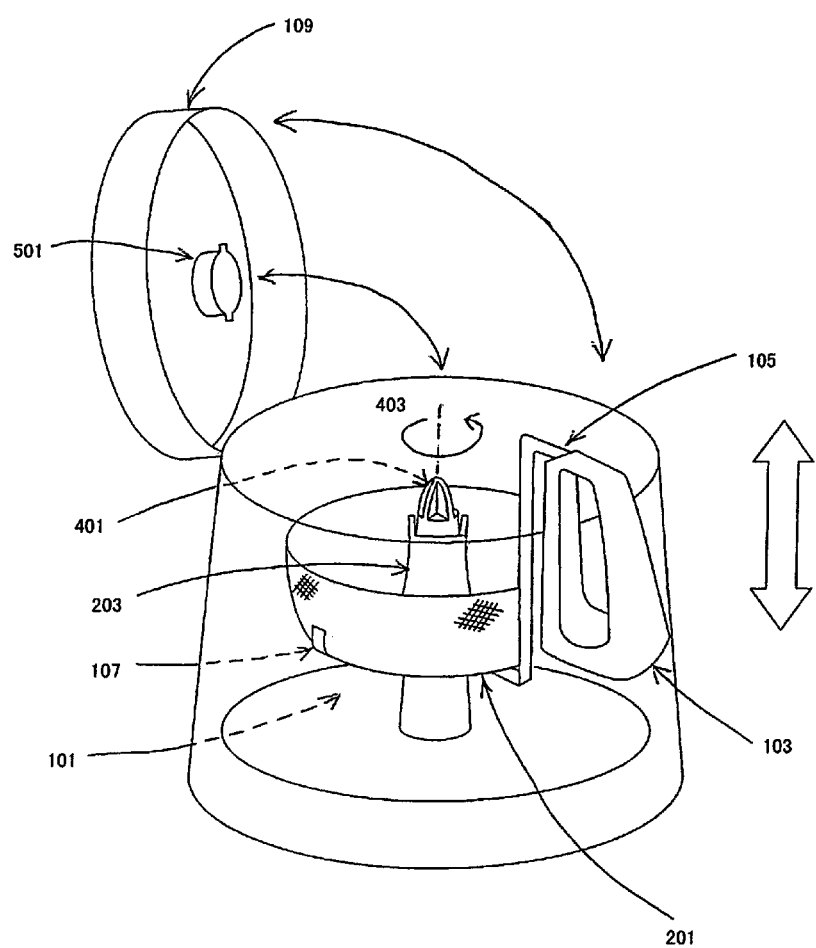
FIG. 1 illustrates an embodiment of the invention.
Figure 1A:
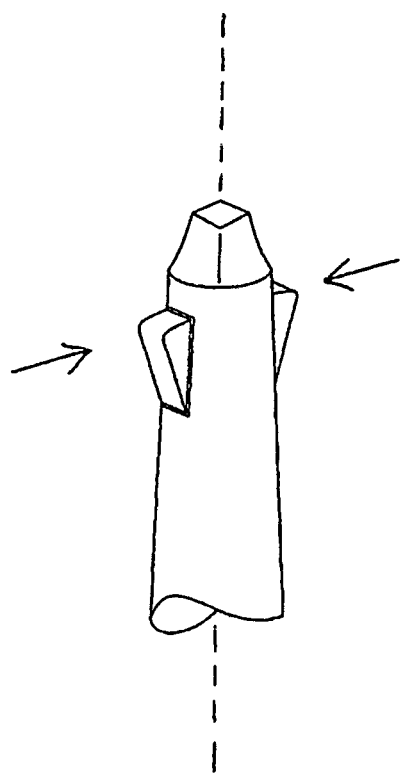
FIG. 1a illustrates a prior art to the invention.

FIG. 1 shows an embodiment of invention comprising an oil container 101. On one side of the external surface of the container 101 is a handle 103. The handle 103 is attached slidably to the external surface of the container 101 and movable relatively to the container 101 in a generally upward-downward direction, as indicated by the arrow in FIG. 1. The handle 103 is attached to an arm 105 which is shaped to reach into the container 101. The arm 105 is connected to a frame 107 inside the container 101. Thus, movements of the handle 103 move the arm 105 and also the frame 107 correspondingly.

A cover 109 is hinged to a side of the container 101. When the cover 109 is closed onto the mouth of the container 101, the cover 109 and the container 101 forms a generally closed environment for food frying. The cover 109 is designed with suitable access holes to provide access of the arm 105 into the container 101, and to allow the arm 105 to raise or lower as manipulated by moving the handle 103. Designs for fulfilling such mechanical requirements are known to the skilled man and need no specific discussion here.

Figure 2:
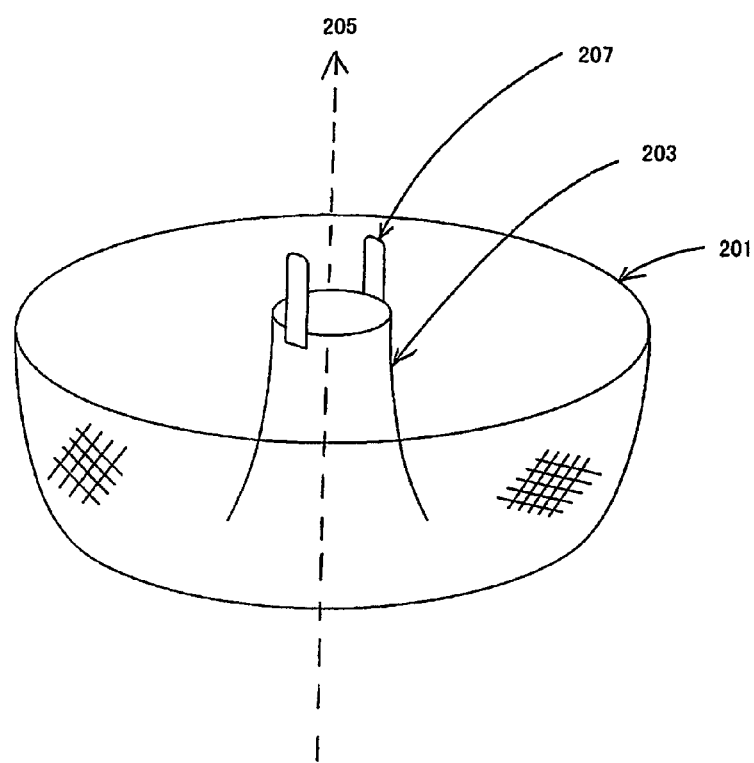
FIG. 2 illustrates a part of the embodiment illustrated in FIG. 1.

FIG. 2 shows a basket 201. The basket 201 is attached to the frame 107 (not illustrated in FIG. 2). The basket 201 is made of wire mesh, or other suitable material and construction for containing food for frying and to allow the oil from the frying to be drained freely from the food. As the basket 201 sits on the frame 107, the basket 201 can be lowered and raised within the container 101 together with movements of the handle 103.

At the centre of the base of the basket 201 is an upwardly extending funnel 203, which defines a through-hole 205 from the base of the funnel 203 to the top of the funnel 203. The funnel 203 is preferably also made of the same material as the rest of the basket 201, such as a wire mesh, but this is not essential. At the top of the funnel 203 of the basket 201 are fins 207 that extend upwardly. The fins 207 can be pushed by a torque to rotate the basket 201, as will be explained further in this description. In this embodiment, the fins 207 are aligned to extend vertically form the top of the funnel 203 although other configurations are possible. Typically, the fins 207 are made of a rigid material such as ceramic, plastic or metal, which is generally non-deformable.

Figure 3:
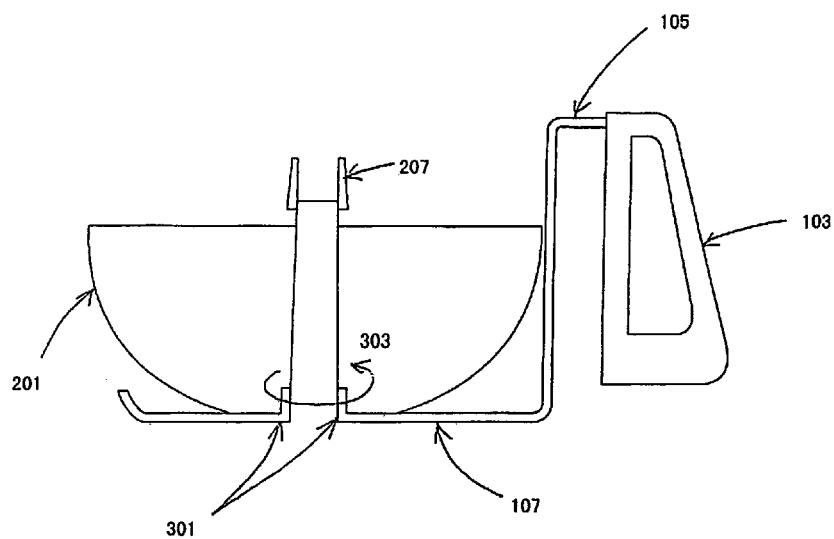
FIG. 3 is a cross sectional illustration of a part of the embodiment illustrated in FIG. 1.

FIG. 3 is a cross-sectional view of the basket 201 connected rotatably to the frame 107. The lower end of the funnel 203 in the basket 201 is slipped onto a sleeve 301 which extends from the frame. Thus, basket 201 is capable of being rotated on the sleeve. The rotation of the basket is thus relative to the frame 107, handle 103 and the container 101, as shown by the arrow 303 in FIG. 3.

Figure 4:
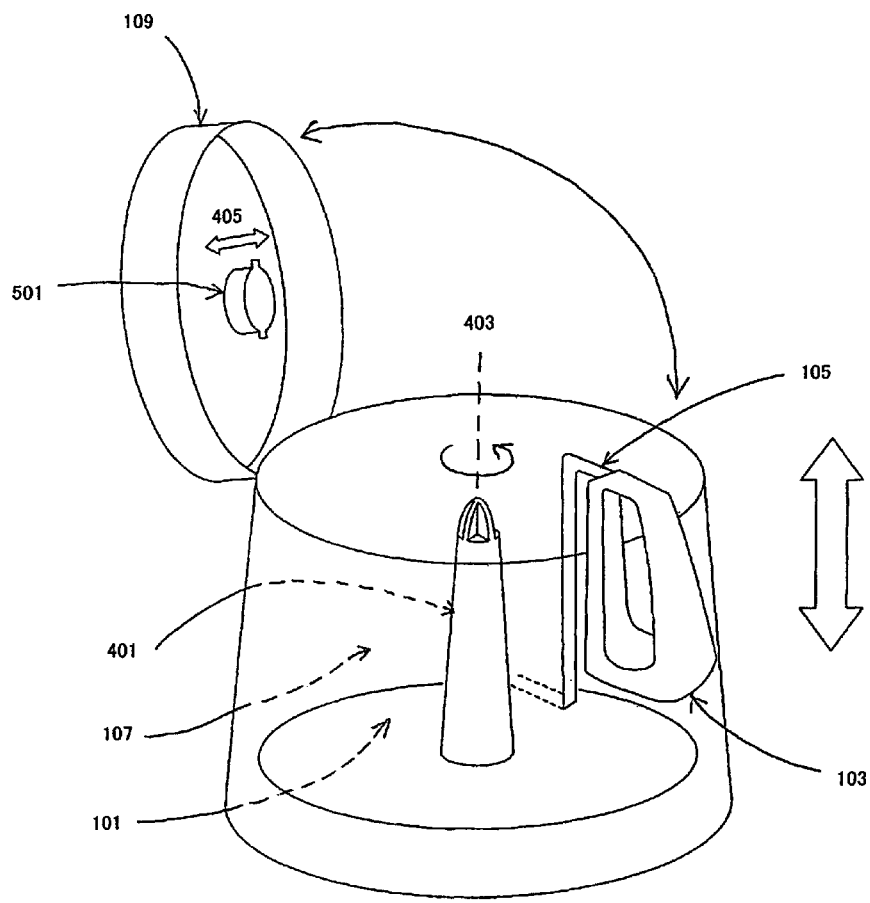
FIG. 4 illustrates the embodiment illustrated in FIG. 1 in part.

FIG. 4 shows a spindle 401 extends upwardly from the bottom of the oil-container 101, in the centre of the oil-container 101. The handle 103, arm 105, frame 107 and basket 201 are omitted in this figure for clarity. The spindle 401 is connected to the base of the container 101. The bottom of the spindle 401 is attached to a motor hidden beneath the base of the oil container 101, which is not illustrated. The motor is capable of driving the spindle 401 to spin so that the spindle 401 is rotatable about the vertical axis 403 of the spindle 401. The technology for driving the spindle 401 to spin is known to the skilled man and need no specific discussion here.

When the basket 201 is placed into the container 101, the funnel 203 of the basket 201 is aligned to the spindle 401 and slipped over the spindle 401 in order to fit into the container 101. This combination is shown in FIG. 1. The spindle 401 therefore guides the positioning and movements of the basket 201 in the oil container 101.

Moving the handle 103 moves the arm 105 and the frame 107 to lower or raise the basket 201 in the container 101. In the lowered position, the basket 201 submerges food contained in the basket 201 into oil in the container 101 so that the food may be fried. In the raised position, the basket 201 is lifted above the oil level so that the food in the basket 201 is moved away from the oil to terminate the frying. In the base of the oil container 101, there is a heater element for heating the oil in the oil container 101. The heater element can be either hidden in the base of the container or placed to be immersed into the oil. This is known to the skilled man and not illustrated nor needed to be discussed in detail here.

FIGS. 1 and 4 show that on the underside of the cover 109, which is the side of the cover 109 facing the inside of the container 101 when the cover is closed onto the oil container 101, is a coupler 501 for coupling to the spindle 401. The coupler 501 is attached to the cover 109 in such a way that it is rotatable.

Figure 5:
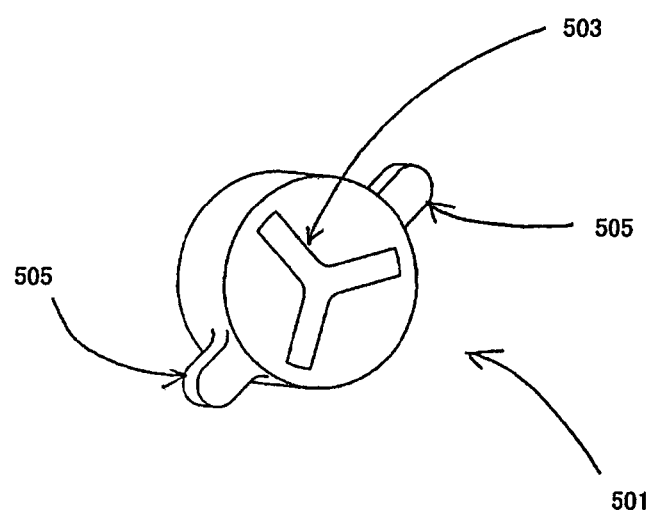
FIG. 5 is a magnification of a part of FIG. 1.
Figure 6:
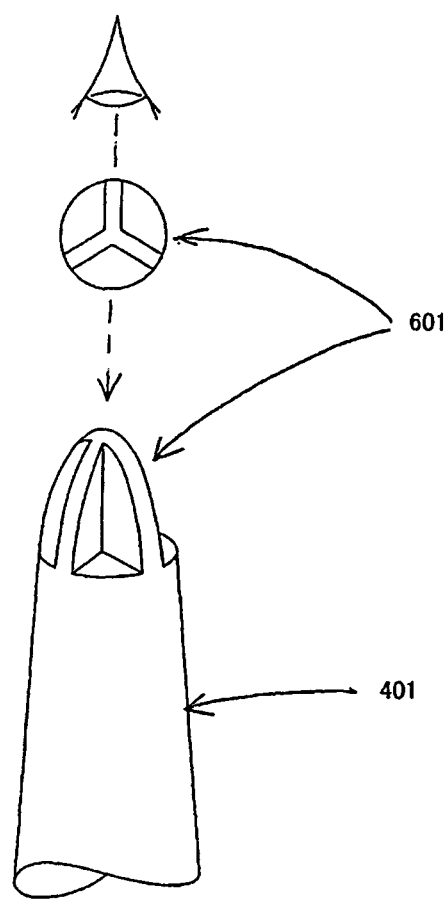
FIG. 6 is a magnification of a part of FIG. 1.

The coupler 501 is illustrated in greater detail in FIG. 5. The centre of the coupler 501 has a groove 503 which has three arms 105, the groove 503 being shaped like the English letter 'Y'. The groove 503 corresponds in shape to a protrusion 601 at the tip of the spindle 401, which also has three arms 105 and a shape like the English letter "Y". FIG. 6 shows an enlarged perspective of the spindle 401 and a corresponding plan view.

Preferably, the coupler 501 is made of a rigid material such as ceramic, plastic or metal, which is generally non-deformable. Similarly, protrusion 601 at the tip of the spindle 401 is also made of a rigid non-deformable material such as ceramic, plastic or metal.

When the cover 109 is closed onto the container 101, the coupler 501 is moved onto the tip of the spindle 401 to engage the spindle 401. The spindle 401 is therefore able to engage the coupler 501 in the same way a screwdriver fits into the groove of a screw.

Preferably, the protrusion 601 is shaped such that the protrusion 601 has a tapered tip. This helps the coupler 501 to rotate and orientate itself to fit onto the protrusion 601 at the tapered tip.

Thus, the protrusion 601 at the tip of the spindle 401 fits into the groove 503 in the coupler 501 in the same way a screwdriver fits into the groove of a screw. Thus, the coupler 501 can be rotated by spinning the spindle 401.

Figure 6A:
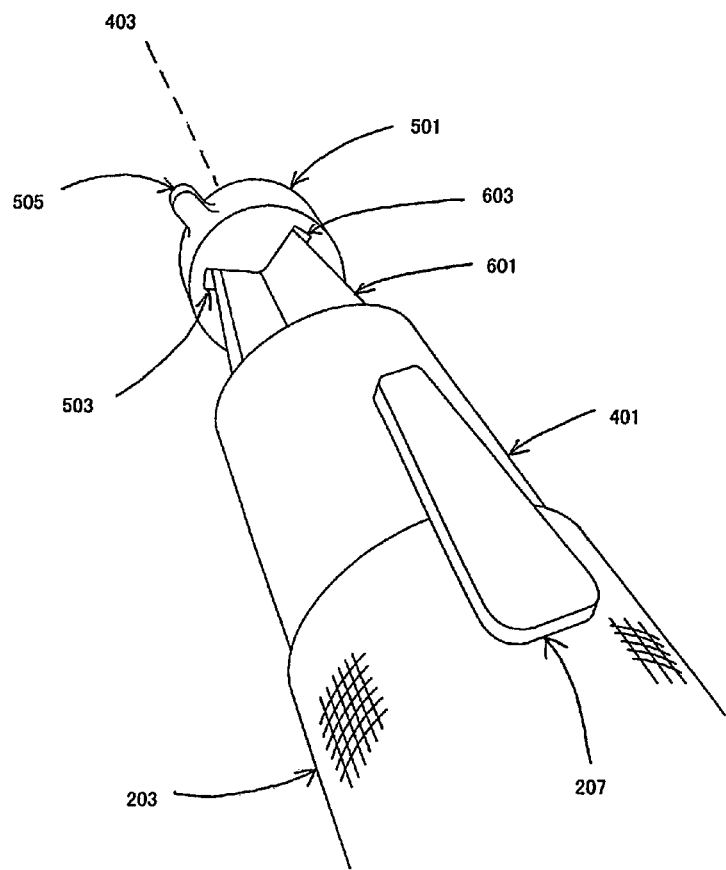
FIG. 6a is a magnification of a part of FIG. 1.

Since the spinning of the spindle applies a torque to the groove 503 in the coupler 501 about the axis of the spindle 401, there is no need for the groove 503 to fit tightly to the protrusion 601 in the vertical direction. Thus, the groove 503 can be dimensioned to have excess space 603 to allow a roomy fitting to the protrusion 601. This excess space 603 is illustrated in FIG. 6a. The excess space 603 prevents the protrusion 601 from being stuck into the groove 503 in the coupler 501. This relieves the embodiment of any deformable product parts, such as a clip to secure the spindle 401 to the coupler 501 or a deformable protrusion 601 to snap-fit into the groove 503, to secure the engagement between the spindle 401 and the coupler 501.

For avoidance of doubt, it should be noted that FIG. 6a also illustrates the funnel 203 fitted onto the spindle 301 but the basket 201 is not in the raised position.

Furthermore, the coupler 109 is preferably mounted to the cover 109 in such a way that the coupler 109 is capable of moving between a position closer to the cover 109 and a position further from the cover 109. This is indicated by a double headed arrow 405 in FIG. 4. If the cover 109 is closed onto the container 101 such that the protrusion 601 at the tip of the spindle 401 are misaligned to the groove 503 in the coupler 501, the coupler 109 is pushed by the spindle 401 into the position closer to the cover 109. When the spindle 401 spins, the protrusion 601 is eventually oriented by the spinning into a position that fits into the groove 503, thereby fully engaging the coupler 109 to rotate the coupler 109.

Figure 7:
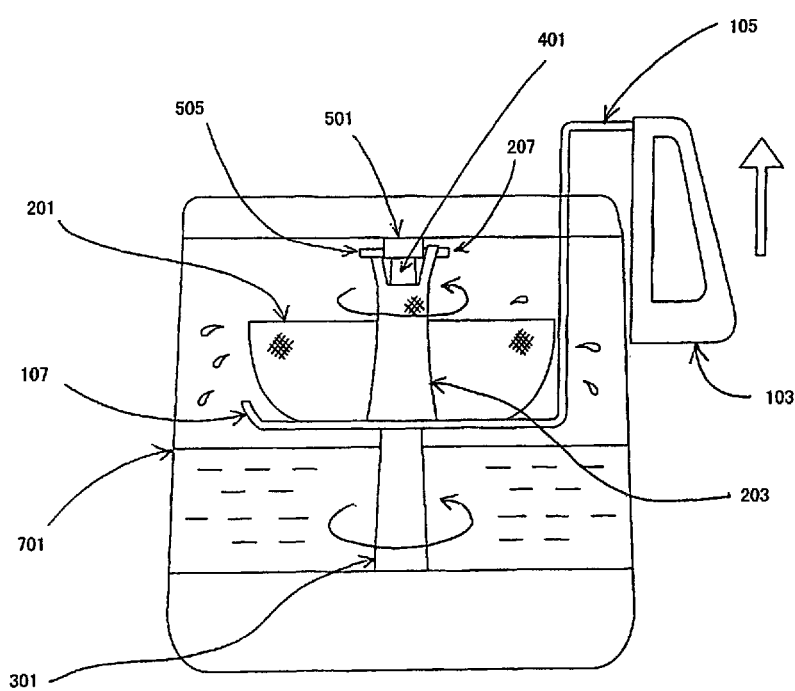
FIG. 7 shows one configuration of the embodiment of FIG. 1.

The coupler 501 has two flanges 505 which extend sidewise. When the basket 201 is in the raised position and when the coupler 501 is rotated by the spindle 401, the flanges 505 pushes against the fins 207 on the funnel 203 to cause the funnel 203 to rotate along with the coupler 501. FIG. 7 shows the basket 201 in the raised position, and the cover 109 closing the container 101. In this raised position, the coupler 501 is rotated by the spindle 401, the coupler 501 is able to rotate the basket 201.

Figure 7A:
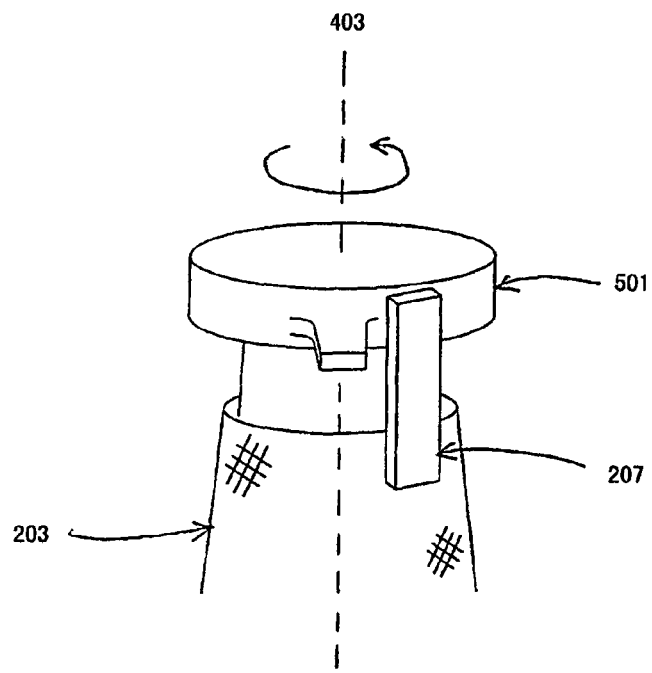
FIGS. 7a and 7b shows the operation of the embodiment of FIG. 1.

FIG. 7a illustrates how the flanges 505 rotate and engage the fins 207. The torque from the rotation of the coupler 501 is applied by the flanges 505 against the fins 207 to rotate the basket 201. The engagement between the flanges 505 and the fins 207 is mainly an abutment of the flanges 505 against fins 207.

Figure 7B:
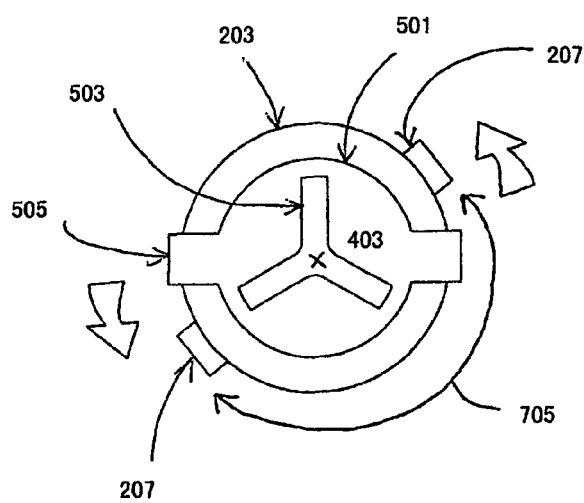

FIG. 7b is a plan view of the coupler 501 and the funnel 203 aligned to the axis of the spindle 401. FIG. 7b shows how the curve distance 705 from one fin 207 to the other fin 207 is so far apart that there is excess space to fit any one of the flanges 505 between the two fins 207. The excess space 705 provides that the flanges do not need to fit tightly between the two fins. Advantageously, this prevents the two flanges 505 of the coupler 501 from getting stuck to the two fins 207 of the funnel 201.

Accordingly, there is no need for any deformable product parts, such as a clips or a snap-fit configuration, to secure an engagement between the basket 201 and the coupler 501.

Therefore, the coupler 501 provides an indirect coupling between the spindle 401 and the basket 201, that is, the spindle 401 engages the coupler 501 which in turn engages the basket 201 to rotate the basket 201. Therefore, the body of the spindle 401 does not need for any securing means such clips to be placed along to engage the funnel 203 directly. In particular, there is no need for any securing means which are deformable to provide a snap-fit engagement between the spindle 401 and the funnel 203. This reduces the likelihood of the spindle 401 and the basket 201 being jammed or stuck onto each other.

To fry food using the embodiment, the user firstly lifts the handle 103 on the external surface of the container 101, so that the frame 107 raises the basket 201.

Oil is then provided into the container 101 to a suitable level 701, such that the basket 201 when in the raised position is above the surface of the frying oil and when the basket 201 is in the lowered position, the food in the basket 201 is submerged in the oil to be fried.

The user then arranges food (not illustrated) into the basket 201.

The cover 109 of the container 101 is then closed onto the container 101. In this configuration, the groove 503 in the coupler 501 fits loosely onto the protrusions 601 on the spindle 401.

The oil is then heated to a suitable frying temperature.

Figure 8:
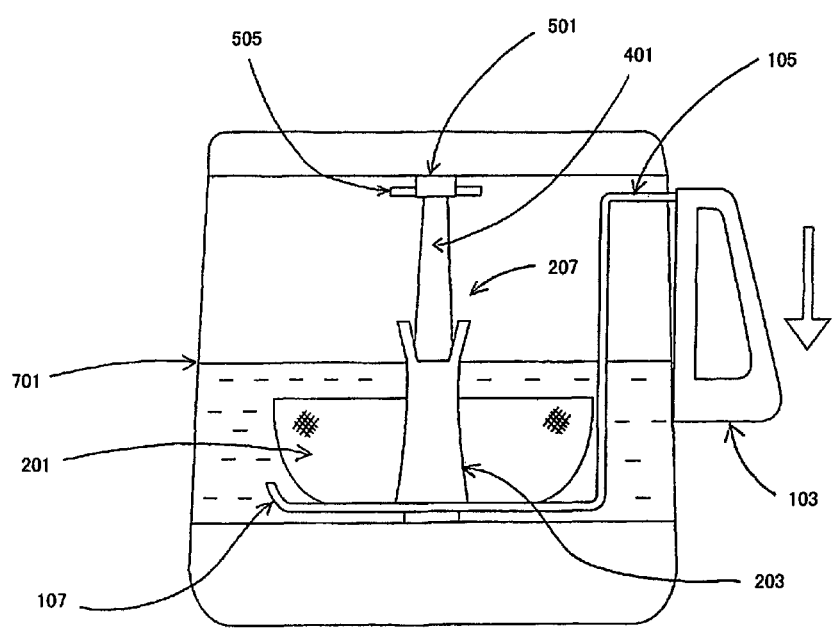
FIG. 8 shows another configuration of the embodiment of FIG. 1.

The basket 201 is then lowered into the heated oil by pulling the handle 103 on the external surface of the container 101 downwards. Thus, the food is lowered with the basket 201 into the heated oil to be fried. This lowered position of the basket 201 is illustrated in FIG. 8.

The spindle 401 guides the funnel 203 of the basket 201 in the upwardly and downwardly movements of the basket 201.

Mechanisms such as a timer may be provided to let the user know if the food has been fried for a specific period of time. When it is decided that the food has been sufficiently fried, the user by means of the handle 103 at the external surface of the fryer lifts the basket 201 from the frying oil without opening the cover 109 the fryer. Thus, the basket 201 is raised above the surface of the oil without opening the cover 109 of the fryer. This raised position is illustrated in FIG. 7.

At this stage, it is optional whether to stop the heating of the oil.

When moving into the raised position, the fins 207 on the funnel 203 extend across the flanges 505. Thus, the fins 207 are put in the way of the flanges 505 if the coupler 501 rotates to move the flanges 505. Accordingly, the flanges 505 on the coupler 501 are able to push against the fins 207 if the coupler 501 rotates.

With a suitable trigger, such as an operation button, the user triggers the motor hidden in the base of the container to spin the spindle 401 about the spindle axis 403. The spinning of the spindle 401 rotates the coupler 501. The flanges 505 of the rotating coupler 501 push against the fins 207 on the funnel 203, and cause the basket 201 to rotate along with the spinning of the spindle 401.

The spindle 401 physically retains the basket 201 in alignment to the axis of rotation of the coupler 501, which allows the coupler 501 to continually rotate the basket 201 as the spindle 401 spins.

If the rotation of the basket 201 is sufficiently fast, oil in the food is dispelled radially to the sidewalls of the container 101 by centrifugal force. This is illustrated as droplets in trajectory in FIG. 7. This removes a significant amount of the oil left on the food from the frying.

Advantageously, the flanges 207 on the coupler 501 do not engage the fins 207 by a deformable engagement means such as a clip; the flanges engages the basket 201 by merely abut or push on the fins 207 to move the basket 201. This relieves the embodiment of a need to have any snap-fit engagement between the spindle, coupler and funnel, or any precision dimension between them. This accordingly reduces the possibility of the basket being stuck to any part of the embodiment, i.e. neither the spindle 401, the coupler 501 nor the frame 107.

When the period of rotating the basket 201 is deemed sufficient to relief the food of as much oil as desirable, the spinning of the spindle 401 is stopped. The user may then open the cover 109 to access the food when the basket 201 is still in the raised position.

Figure 9:
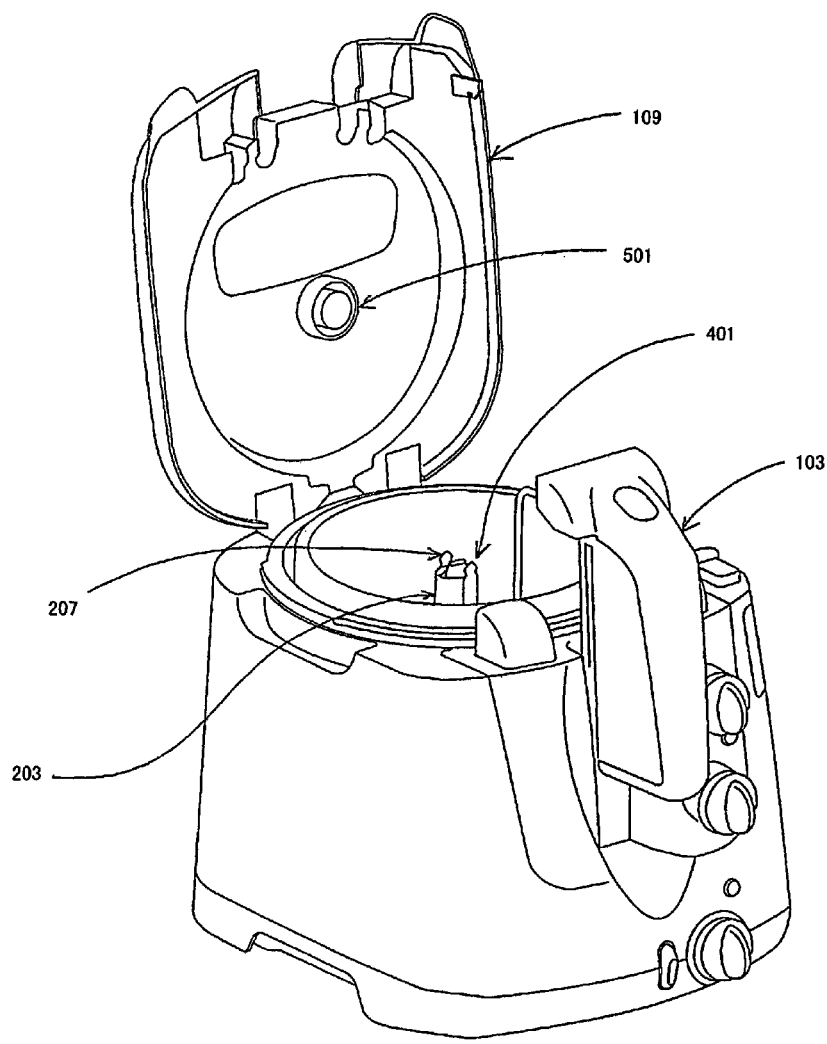
FIG. 9 is an illustration of the embodiment in possible manufacturing detail, showing the handle moved to a raised position.
Figure 10:
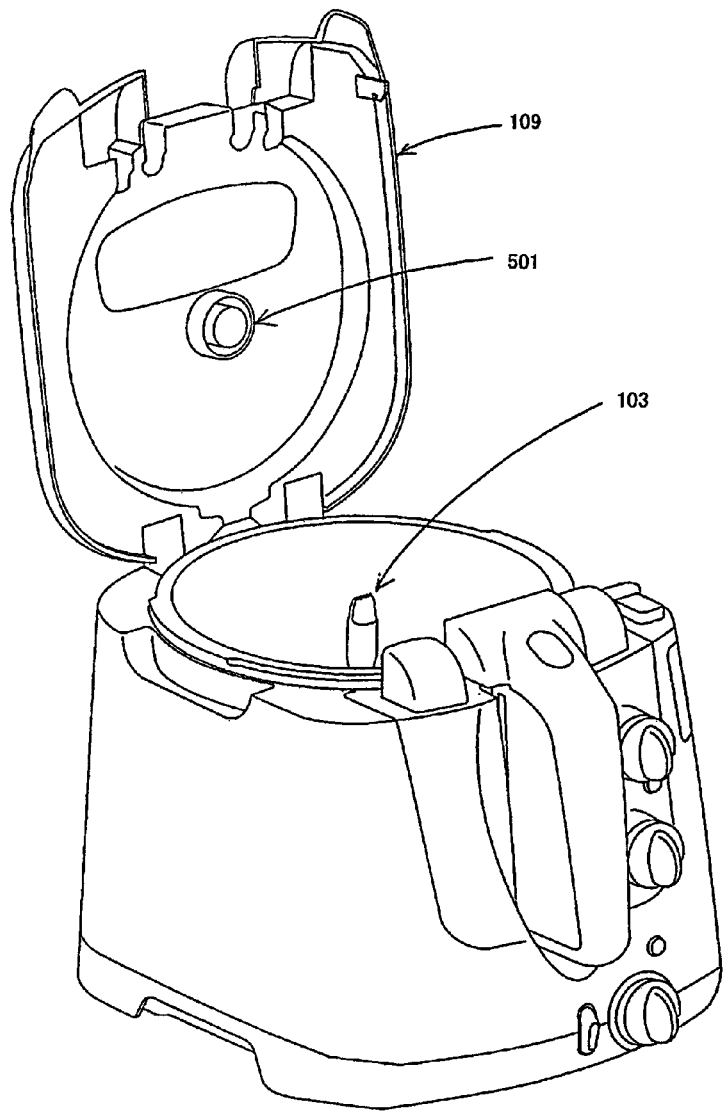
FIG. 10 is an illustration of the embodiment in possible manufacturing detail, showing the handle moved to a lowered position.

FIG. 9 is an illustration of the embodiment in one possible production detail, with the handle 103 in a raised position. The fins 207 on the funnel 203 can be seen in FIG. 9. FIG. 10 is an illustration of the embodiment in one possible production detail, with the handle 103 in a lowered position.

Therefore, a fryer comprising a container 101 for containing oil for food frying; the container 101 having a spindle 401 capable of spinning; a basket 201 for containing food, the basket 201 capable of being positioned in the container 101 such that food in the basket 201 is away from the oil; the basket 201 having at least one fin 207; at least one flange 503, the flange 503 being movable by the movement of the spindle 401; in a first position, the fin 207 and the flange 503 are not positioned to engage each other; in a second position, the fin 207 and the flange 503 are positioned to engage each other, such that the flange 503 when moved by the movement of the spindle 401 being capable of pushing on the fin 207 to rotate the basket 201; wherein the fin 207 and the flange 503 are each dimensioned such that there is an excess space between the flange 503 and the fin when the flange 503 and the fin are moved from the first position into the second position.

In other words, the embodiment provides that the fins 207 and the flanges 503 interweaved with sufficient excess space or distance between them to prevent the fins 207 from getting stuck to the flanges 503.

Figure 11:
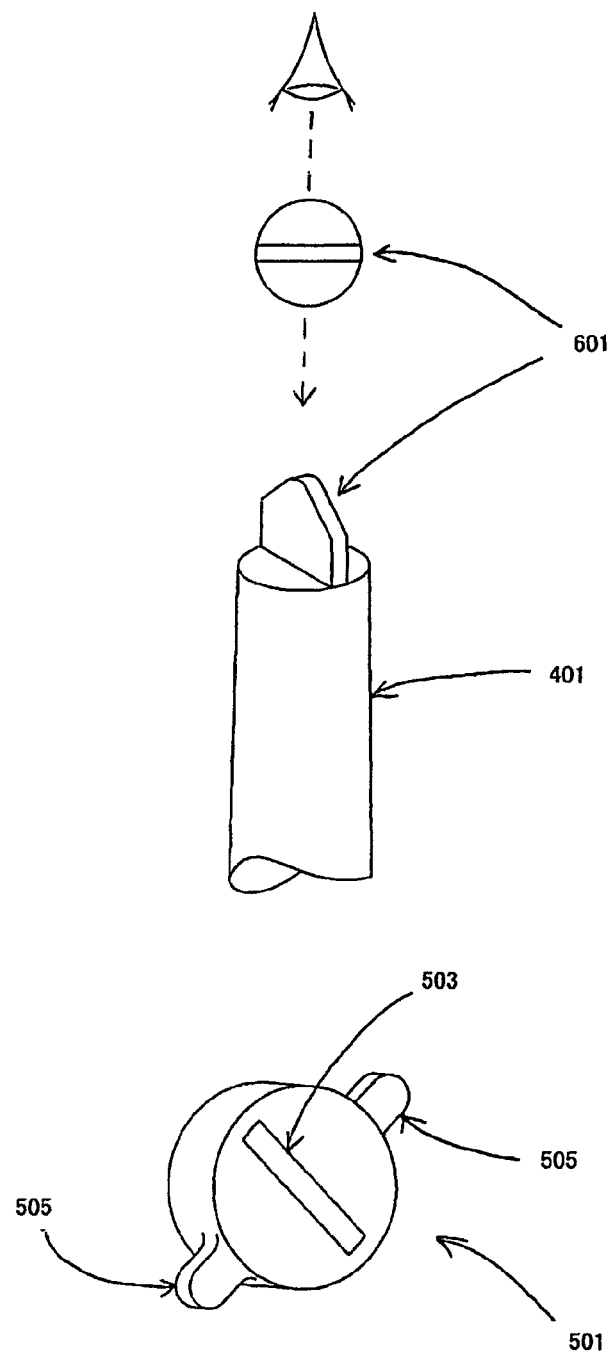
FIG. 11 is an illustration of a variation of the part of the embodiment of FIG. 6.

FIG. 11 shows a variation of the design of the protrusion 601 at the tip of the spindle 401 for engaging the coupler 501, in which the coupler 501 is a single, straight slot that fits a corresponding straight protrusion 601 at the tip of the spindle 401.

Figure 12:
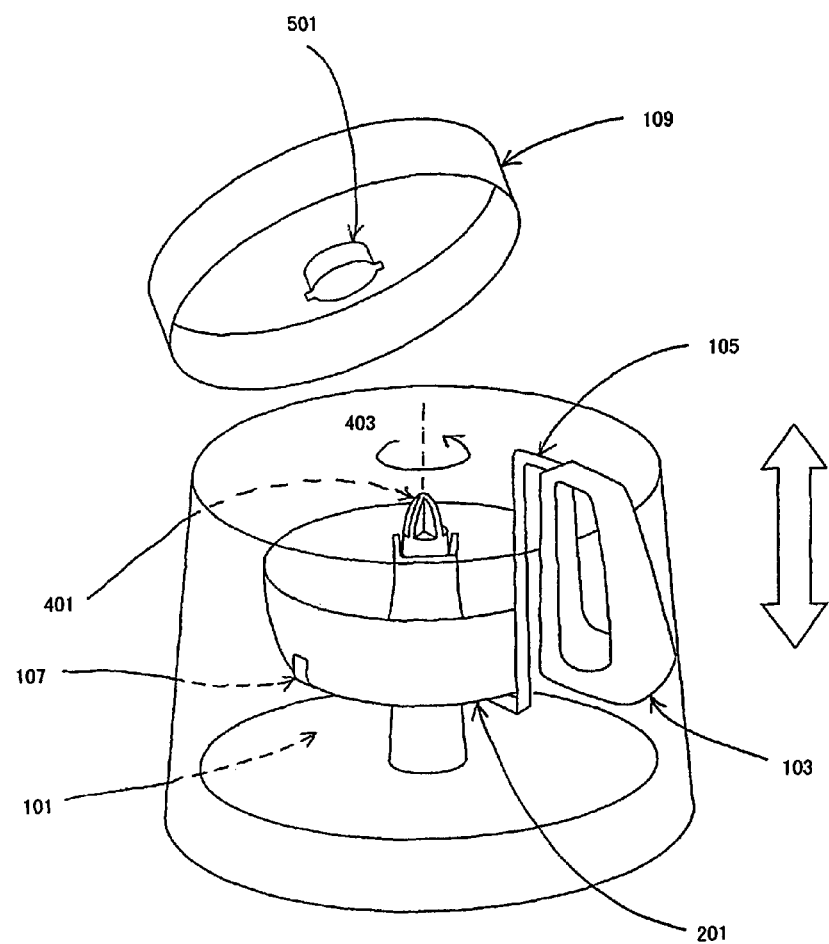
FIG. 12 is an illustration of a variation of the embodiment of FIG. 1.

FIG. 12 shows yet another variation of the embodiment, in which the cover 109 is not hinged to the container 101. In this variation, the cover 109 is separable from the container 101. Such a cover 109 may be engineered to fit precisely on the mouth of the container 101, the spindle 401 and the funnel 203 in order to spin oil from food in the raised basket 201.

Figure 13:
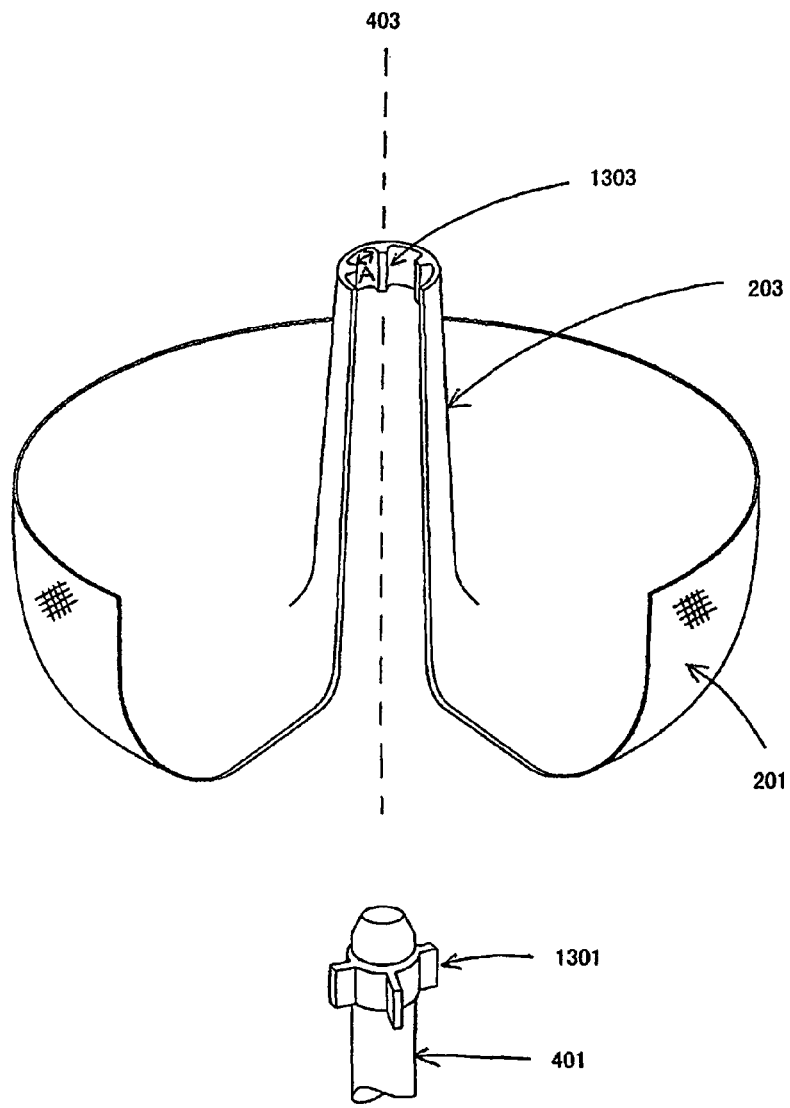
FIG. 13 is an illustration of a second embodiment of the invention.
Figure 14:
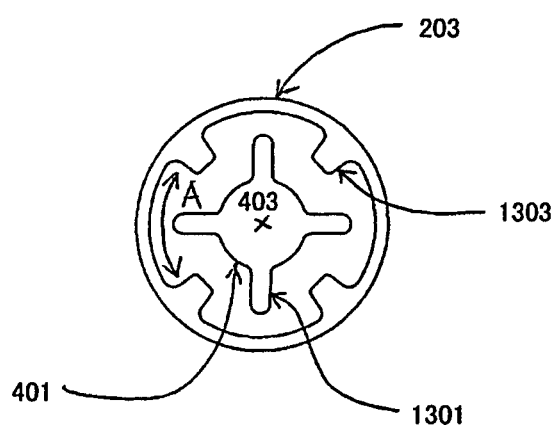
FIG. 14 is an illustration of a part of the embodiment of FIG. 13 from the plan.

FIG. 13 shows a simplified and dissected illustration of a further embodiment of the invention. In this other embodiment, the coupler 501 is not required. Thus, the spindle 401 does not rotate a coupler 501 which in turn rotates the basket 201. Instead, the spindle 401 has radially extending flanges 301 that are arranged along the spindle 401 body. There are corresponding fins 1303 lining the inner surface of the funnel 203 that extends radially inwardly. The flanges 1301 of the spindle 401 and the fins 1303 of the basket 201 correspond to each other, so that the spindle 401 rotates the basket 201 when it spins. However, fins 1303 of the basket are spaced apart from each other such that there is an excess space, marked as 'A', between any two neighbouring fins 1303 for movement of a flange 1301. Thus, each flange 1301 of the spindle has freedom of movement in the excess space defined between every neighbouring fin 1303 and funnel 203. This excess space is illustrated further in FIG. 14, showing the plan view of the embodiment of FIG. 13. The excess space between each pair of fins 1303 on the funnel 203 prevents the funnel 203 from being stuck onto the spindle 401. Preferably, but not necessarily, the flanges 1301 of the spindle 401 and the fins 1303 of the basket 201 are made of a rigid material such as metal, ceramic or a suitably rigid plastic, which is generally non-deformable.

The skilled man understands that, although the embodiment of FIG. 13 shows a plurality of flanges 1301 on the spindle 401 and a corresponding plurality of fins 1303 on the basket 201, it is possible in some variations of the embodiment that there is only one flange 1301 on the spindle 401 and only one fin 1303 on in the funnel 203, which are sufficient for the spindle 401 to rotate the basket 201.

While there has been described in the foregoing description preferred embodiments of the present invention, it will be understood by those skilled in the technology concerned that many variations or modifications in details of design, construction or operation may be made without departing from the scope of the present invention as claimed.

For example, although the basket is discussed as being made of wire mesh, including the funnel, it is possible in come configurations that the funnel is not made of mesh like the rest of the basket. The funnel can be made of a suitable continuous non-woven piece of metal, for example.

Furthermore, other material suitable for containing food to be fried can be used for the basket, such as in bamboo woven basket.

Furthermore, the motor can be secured to the cover 109 instead of the bottom of the fryer. In this case, the coupler 501 is rotated directly by the motor and not the spindle 401.

The invention claimed is:

1. A fryer comprising:
    a container for containing oil for food frying, the container having a spindle capable of spinning;
    a basket for containing food, the basket capable of being positioned in the container such that food in the basket is away from the oil, the basket having at least one fin;
    at least one flange, the flange being movable by the movement of the spindle;
    a motor positioned in a base region and beneath the container in the fryer for driving the spindle;
    wherein the fin and the flange are not positioned to engage each other in a first position, and the fin and the flange are positioned to engage each other in a second position, such that the flange, when moved by the movement of the spindle, is capable of pushing on the fin to rotate the basket.

2. The fryer as claimed in claim 1 further comprising:
    a coupler;
    the at least one flange being attached to the coupler;
    the spinning of the spindle is capable of rotating the coupler to move the at least one flange; wherein
    the coupler translates the spinning of the spindle to the basket,
    whereby the coupler provides an indirect coupling between the spindle and the basket to
    allow the spindle to rotate the basket in a raised position.

3. The fryer as claimed in claim 2 further comprising:
    a cover;
    the coupler being rotatably mounted onto the cover;
    when the cover is closed onto the container, the cover is capable of moving the coupler to engage the spindle so that the spinning of the spindle is capable of rotating the coupler to move the flange.

4. The fryer as claimed in claim 1 wherein the basket has a funnel for slipping over the spindle.

5. The fryer as claimed in claim 3, wherein the coupler is movable between a position closer to the cover and a position further from the cover whereby jamming due to misalignment of the spindle and the fin is minimized.

6. The fryer as claimed in claim 1, wherein the fin and the flange are each dimensioned such that there is an excess space between the flange and the fin when the flange and the fin are moved from the first position into the second position.

* * * * *